(122.)

ALBERT HEBBARD.

Improvement in Car Springs.

No. 4,670. Reissued Dec. 12, 1871.

Witnesses: { Wm. R. Wright, Thos. A. Burtt.

Inventor. Albert Hebbard by his Attorney — [signature]

AM. PHOTO-LITHOGRAPHIC CO. N.Y. (OSBORNE'S PROCESS.)

UNITED STATES PATENT OFFICE.

ALBERT HEBBARD, OF CAMBRIDGE, MASSACHUSETTS, ASSIGNOR TO HIMSELF AND JOHN P. ONDERDONK, OF PHILADELPHIA, PENNSYLVANIA.

IMPROVEMENT IN CAR-SPRINGS.

Specification forming part of Letters Patent No. 53,222, dated March 13, 1866; reissue No. 4,335, dated April 11, 1871; reissue No. 4,670, dated December 12, 1871.

*To all whom it may concern:*

Be it known that I, ALBERT HEBBARD, formerly of the city of Buffalo, county of Erie and State of New York, but now of Cambridge, Massachusetts, invented a new and Improved Spiral-Nest Spring for Railroad Cars and for other purposes; and the following is hereby declared to be and exact description thereof, reference being had to the accompanying drawing making a part of this specification, in which—

Figure 1:
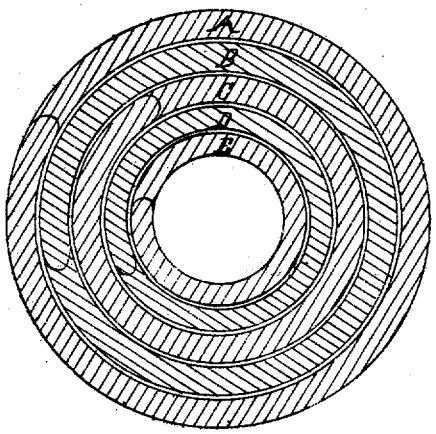
Figure 2:
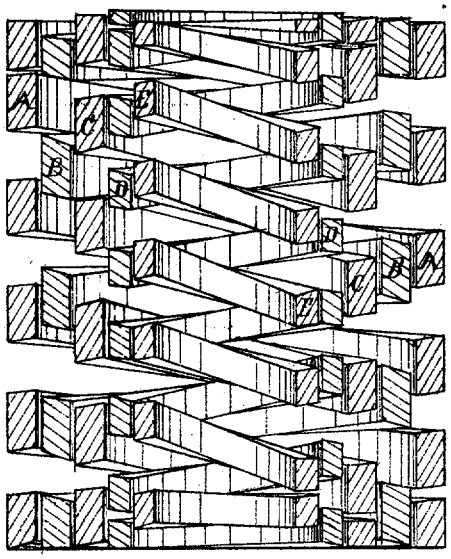

Figure 1 is a plan view of a spring made in accordance with this invention; Fig. 2, a vertical central section of the same.

This invention relates to a spiral-nest spring for railroad cars and other purposes—that is to say, a spring composed of two or more separate spiral springs arranged, one within the other, in nest, each spring being distinct from the other or others, but the whole acting together, when occasion requires, as one spring.

Heretofore it has been attempted to inclose a nest of concentric spiral springs in a cylindrical case; but the inconvenience of the application of such an arrangement led to their abandonment.

The object of my invention is to produce an open-nest spiral spring—that is, one in which there shall be no casing at the side—this compound nest-spring being held in place at top and bottom by a cup extending a short distance over the spring, or by a recess, or between open plates instead of being inclosed in a casing.

The nature of the invention and the manner in which the same is or may be carried into effect will be fully understood by reference to the accompanying drawing.

A represents a spiral spring of any given form of coils, diameter, length, and strength of metal, constructed according to any well-known method of making spiral springs. B is a spiral spring, similar in construction to and arranged concentrically within A. C, D, and E are similar springs, arranged concentrically within B, as shown in the drawing. In making this nest-spring it is preferred to coil the different springs alternately to the right and left, so that when placed in nest the first or outside spring being coiled to the right, the second or next inside will be coiled to the left, and so on. The several coils which compose the spring may, however, be coiled in the same direction. It has also been contemplated to make a slight difference in the length or height of the several coils constituting the nest, so as to adapt the nest to a light or heavy load. For instance, the two outer coils being of a given length, the third is a little shorter, and the fourth a trifle shorter than the third, and so on, so that with a light load the two outer springs would sustain the weight; the load being increased, the first, second, and third coils would mutually act; and with a still heavier load the fourth would also act, and so on.

It will, of course, be understood that the spiral-nest springs will vary in size, strength, and elasticity, according to the place and purpose for which they are to be used. They are believed to be much superior to rubber springs or metallic springs of any other construction heretofore in use for railroad cars and for all places where springs of great strength and durability are required.

In case one coil should prove defective or should break, it can be easily replaced by another, so that the breaking of one does not impair the usefulness of the others, and the nest can be kept good at all times.

This spring is cheaper in construction and more perfect in action than any other kind of metallic spring for railroad cars.

What is here claimed as my invention is—

A nest-spring of concentric spirals, open or unclosed at the sides.

Witnesses: ALBERT HEBBARD.

H. R. HARDING,

C. C. HEBBARD.